(12) United States Patent
Pratt

(10) Patent No.: US 6,409,367 B1
(45) Date of Patent: Jun. 25, 2002

(54) REAR-MOUNTED VEHICLE LIGHTING SYSTEM

(76) Inventor: Richard Pratt, 332 New Portland Rd., Gorham, ME (US) 04038

( * ) Notice: Subject to any disclaimer, the term of this patent is extended or adjusted under 35 U.S.C. 154(b) by 0 days.

(21) Appl. No.: 09/612,335

(22) Filed: Jul. 6, 2000

(51) Int. Cl.[7] .............................................. F21V 101/14
(52) U.S. Cl. ...................... 362/505; 362/506; 362/485; 340/471; 340/472; 340/473
(58) Field of Search ................... 362/505, 506, 362/496, 493, 427, 485, 549, 287, 371; 340/468, 470, 471, 472, 473; 248/284.1

(56) References Cited

U.S. PATENT DOCUMENTS

| | | | |
|---|---|---|---|
| 4,023,030 A | * 5/1977 | Teti | 362/485 |
| 4,091,442 A | 5/1978 | Markey | |
| 4,234,908 A | * 11/1980 | McGee | 362/154 |
| 4,236,194 A | * 11/1980 | Norman | 362/370 |
| 4,286,309 A | 8/1981 | Rasinski | |
| 4,302,799 A | * 11/1981 | Behrens | 362/226 |
| 4,395,749 A | * 7/1983 | Poveromo | 362/269 |
| 4,422,664 A | * 12/1983 | Poveromo | 280/414.1 |
| 4,658,335 A | * 4/1987 | Culler | 362/269 |
| 4,800,471 A | 1/1989 | Lippert | |
| 4,809,138 A | 2/1989 | Stovall | |
| 4,903,174 A | 2/1990 | Busby | |
| 5,134,385 A | 7/1992 | Coleman | |
| 5,144,538 A | * 9/1992 | Harris | 362/154 |
| 5,157,591 A | 10/1992 | Chudzik | |
| D351,671 S | 10/1994 | Beacom | |
| 5,438,490 A | 8/1995 | Woodbury | |
| 5,688,036 A | 11/1997 | Marshall et al. | |
| 5,950,891 A | 9/1999 | Brungardt et al. | |
| 6,007,033 A | 12/1999 | Casson et al. | |

* cited by examiner

Primary Examiner—Thomas M. Sember
(74) Attorney, Agent, or Firm—Pierce Atwood

(57) ABSTRACT

A system for coupling a warning light to a rear of a vehicle. The system includes a coupling bar for connecting the unit to a conventional tow bar deployed on the rear of the vehicle. A beacon mount is pivotally connected to the coupling bar so that it may be pivoted away from the rear of the vehicle without removing the unit from the tow bar. A warning beacon is affixed to the top of the beacon mount such that when the system is deployed, the beacon is positioned at or above the height of the vehicle. A supplemental beacon guard may be deployed adjacent to the beacon so as to prevent direct viewing of the beacon by the vehicle driver. The coupling bar comes in two designs. The first includes a pair of extensions that terminate in rear-facing lights designed to enhance visibility behind the vehicle. Corner markers may also be employed on the ends of the extensions to provide the driver with a visual identifier of the rear corners of the vehicle. The other embodiment of the coupling bar includes on the beacon mount a pair of rear-facing lights. The system may alternatively be used deployed in a roadway as a warning light system for oncoming traffic.

9 Claims, 2 Drawing Sheets

REAR-MOUNTED VEHICLE LIGHTING SYSTEM

BACKGROUND OF THE INVENTION

1. Field of the Invention.

The present invention relates to rear-mounted vehicle lighting systems. More particularly, the present invention relates to rear-mounted lighting systems adapted to be connected to vehicle trailer hitches. Still more particularly, the present invention is related to an illumination system for vehicles with snowplows. The present invention is a rear-mounted lighting system easily installed and removed with minimum impact on the vehicle.

2. Description of the Prior Art.

Snowplowing is a necessary task in those parts of the world where snow falls and remains on vehicle-accessed surfaces including, but not limited to roadways, open parking lots, and public and private driveways. Much snowplowing is performed by state and local agencies, but generally only for public roads and facilities. All private roadways, driveways, lots, and the like employ non-public means for snow removal. As a result, there are many commercial and private providers of snowplowing services. Chemical treatment, shoveling, and walk-behind snowblowers effect some cleaning of relatively small private surfaces. Vehicles, such as trucks and tractors, on which snowplows are permanently or removably deployed, ordinarily clean the remainder of private surfaces.

Those vehicles used to perform snowplowing services are typically required to have deployed thereon a warning light mechanism. The warning light is designed to advise observers near the vehicle of the existence of the vehicle as one involved in an activity different from a conventional vehicle moving along on a surface. The warning light or beacon is typically deployed at or near the highest area of the vehicle and is most effective at night and/or during stormy weather conditions. In most instances, the beacon light is a flashing or strobe light designed to draw the attention of nearby observers to the existence of the plow vehicle. Vehicles specifically designed for snowplowing, such as municipal snowplow trucks, are made with one or more beacons originally built into the vehicle structure.

For those vehicles not specifically designed solely for snowplow operation, such as a private four-wheel-drive truck for example, a beacon is not ordinarily built into the vehicle's structure when in original production. Instead, if it is of interest to the vehicle operator to use such a vehicle for snowplowing, the user must adapt one or more beacons to the vehicle structure in order to provide the warning light. In many instances, this is achieved by placing a magnetized beacon on the vehicle's uppermost metal surface, such as the roof of the cab, or by cutting a hole in that surface, inserting a beacon housing, and sealing the hole. Trailing electrical cable is then coupled from the beacon to a vehicle-based power supply. That cable may reside within the vehicle or it may be located externally.

There are limitations in regard to the existing means for connecting a warning light to a vehicle after vehicle production. The magnetically coupled beacons often do not have sufficient holding force to maintain the beacon in place. Although it is advantageous in that it does not mar significantly the vehicle's surface where it is attached. Moreover, it may be removed from that surface when not in use. However, under the significant stresses a vehicle experiences when plowing, for example when sudden impact with difficult-to-move objects occurs, the magnetized beacon may be dislodged fairly easily.

In regard to the permanent attachment of the beacon in a hole of the vehicle, that too has its limitations. First, it is relatively expensive to modify the vehicle in that way for the sole purpose of inserting an exterior light used only under certain relatively limited circumstances. Second, the modification mars the vehicle's surface and may result in leakage into the interior of the vehicle if the insertion is not carried out properly. Third, it is a permanent fixture that can only be removed with the type of difficulty and expense related to that of the original insertion. It does, however, address the limitation of possible dislodging that may be experienced with the magnetic beacon.

Although not a direct problem with either of the beacon affixing methods described above, there is an indirect limitation related to the placement of the beacon. Specifically, the beacon is typically applied to the top of the cab of a snowplow-capable truck. That may be helpful to the surrounding observers but less directly observed by the vehicle operator. It would be easier for the vehicle operator to have the beacon in a location easier to see and/or in a location that would signal to the operator the proximity of the vehicle to surrounding objects that should not be contacted. That characteristic is of particular value when operating the vehicle in the dark and/or in inclement weather when visibility is reduced. In that regard, it would be preferable to have a lighting system at the rear of the vehicle rather than at solely the top.

Several systems for providing some form of lighting arrangement at the rear of a vehicle have been described. U.S. Pat. No. 5,134,385 issued to Coleman describes a rear-attached signaling system that may be applied to a trailered vehicle. The system is not deployed directly on the vehicle. U.S. Pat. No. 4,809,138 issued to Stovall describes a taillight assembly for a boat trailer. That too is not deployed directly on the vehicle. Neither Coleman nor Stovall describes a lighting arrangement that adequately addresses the needs of the snowplow operator, particularly in regard to placement of the lighting.

Therefore, what is needed is a vehicle warning-light system suitable for easy applicable to and removal from a vehicle. What is also needed is a vehicle warning-light system that may be deployed on a vehicle in a position suitable for the vehicle operator to observe it when in used. Further, what is needed is a vehicle warning-light system that may be deployed on a vehicle without impact on the ordinary use of the vehicle. Such a system for use on a snowplowing vehicle is particularly desirable.

SUMMARY OF THE INVENTION

It is an object of the present invention to provide a vehicle warning-light system suitable for easy applicable to and removal from a vehicle. It is also an object of the present invention to provide a vehicle warning-light system that may be deployed on a vehicle in a position suitable for the vehicle operator to observe it when in used. Further, it is an object of the present invention to provide a vehicle warning-light system that may be deployed on a vehicle without impact on the ordinary use of the vehicle. It is a particular object of the present invention to provide a warning-light system deployed on the rear of a vehicle for use during snowplowing operations.

These and other objects are achieved in the present invention, which is a rear-mounted vehicle warning-light system including a pivot mechanism. The system is affixed to the vehicle using a system insertion leg terminating in a conventional hitch insert that connects to the vehicle's conventional rear trailer hitch. That hitch may be either a ball hitch or a tube hitch. The system includes a beacon deployment leg that is pivotably connected to, and extends upwardly from, the insertion leg. The deployment leg may be of any desired length but is preferably long enough to deploy the beacon to a height approximating the top surface of the vehicle to which it is connected. The deployment leg is pivotably coupled to the hitch insertion leg of the system. The pivot is configured so that the deployment leg may be pivoted away from the rear of the vehicle so that that region of the vehicle may be accessed. For example, if the vehicle is a truck, the beacon deployment leg may be pivoted away from the rear to allow access to and movement of the truck's tailgate. A fixed deployment leg would block that access. The pivot may be a spring-loaded mechanism maintained upright when the spring is in tension. Alternatively, it may be a pin-in-port arrangement such that when the pin is positioned within the port the deployment leg is in a locked position, either up or down.

Additional useful and novel aspects of the warning-light system of the present invention include a set of secondary rear lights that may be mounted directly on the beacon deployment leg. Alternatively, two spaced backing light mount legs may be applied to the insertion leg of the system. The two light legs are preferably pivotable so that they swing out to a substantially horizontal orientation when the system is in use. The light mount legs are preferably designed to swing substantially just beyond the width of the vehicle and topped with corner markers to allow the user to observe that area of the vehicle more easily.

The beacon and/or the secondary lights may be powered through the conventional hitch electrical mechanism. When the beacon and lights are powered in that way, their wiring must be connected to the hitch electrical outlet. In addition, the vehicle must employ a switch to turn off operation of the beacon and/or lights when desired. Alternatively, the beacon and/or lights may be powered by other means, such as an electrical connection to a cigarette lighter of the vehicle or some other supply associated with the vehicle or even by remote means, such as a building outlet and an extension cord.

The lighting system may be used by small-scale snow-plow operators as an alternative to applying a magnetically-mounted beacon, or as an alternative to a permanent mounting through the top of a truck cab. Further, having the beacon lighting system placed at the rear of the vehicle in an easily removable way ensures that the beacon is the first thing observed by those coming up on the vehicle from the rear. The noted additional lighting components aid the vehicle operator in observing the surrounding area behind the vehicle. The corner markers further assist the vehicle operator by establishing positioning of the vehicle with respect to objects behind the vehicle.

It can be seen that the warning light system of the present invention may also be deployed as a roadway warning system deployed at a distance from the vehicle to which it is electrically connected. For example, in an emergency event, such as a fire, the warning system may be removed from the rear of the vehicle and stood in position on a roadway as a warning to oncoming vehicles. The beacon and/or the rear-facing lights can then be powered and operated to signal oncoming traffic either to halt or to proceed with caution. In that way, emergency service providers, such as volunteer firemen, for example, may arrive at the scene of an event, deploy the warning system in the roadway, and leave the vehicle off the roadway for safety purposes. The warning system, when deployed in this way, may be powered directly from the vehicle in the manner described, or it may be powered by extension cord tied to a supply further from the vehicle.

These and other advantages of the present invention will become apparent upon review of the following description and the accompanying drawings.

DESCRIPTION OF THE PREFERRED
EMBODIMENT OF THE INVENTION

Figure 1:
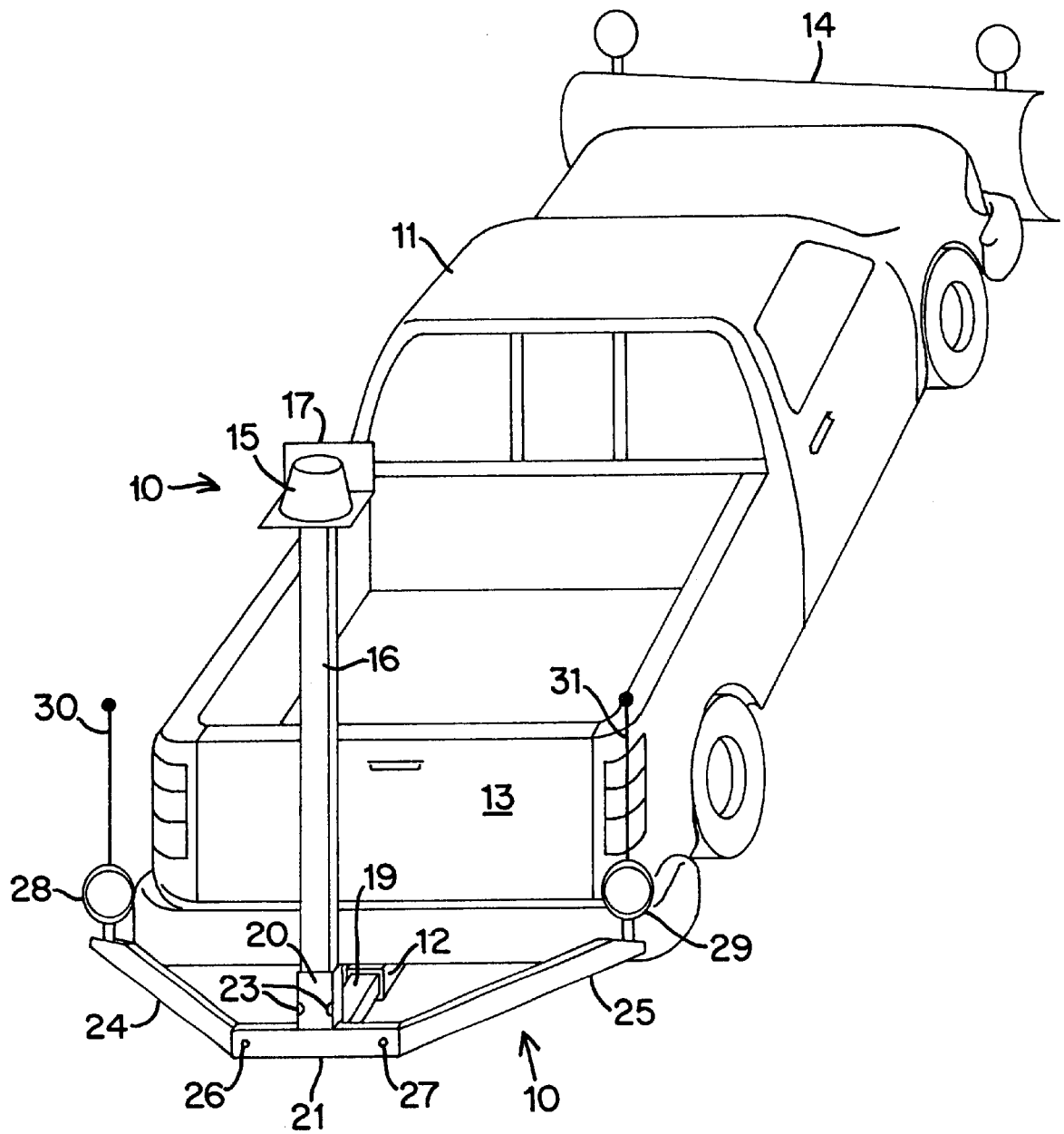
FIG. 1 is a perspective view of a first embodiment of the rear-mounted warning-light system of the present invention shown connected to the rear of a vehicle.

A rear-mounted warning-light system 10 of the present invention is shown coupled to a vehicle 11 in FIG. 1. Although the vehicle 11 may be any type including a rear-towing receptacle 12 that is commercially available. For illustration purposes only, the vehicle 11 is shown as a truck having a rear tailgate 13. Importantly, the vehicle 11 for which the system 10 is most suitable is one capable of performing snowplow services with a front-mounted snow-plow 14. The system 10 is designed to complement use of the plow 14 by providing the driver with improved rear lighting and a mounted warning beacon 15. The beacon 15 is the type generally coupled to emergency-type vehicles and may be a strobe or flashing type. The beacon 15 is preferably retained as part of the system 10 such that it resides at a level at or near the equivalent of an uppermost portion of the vehicle 11 so that the beacon 15 can be observed by individuals approaching the vehicle 11 from the front or the rear.

In addition to the beacon 15, the system 10 includes a beacon mount leg 16 on which the beacon 15 is removably affixed. The beacon mount leg 16 optionally includes a beacon guard 17 that is affixed adjacent to the side of the beacon 15 closest to the vehicle driver compartment so that light from the beacon 15 will be blocked from the driver's direct field of vision when peering rearwards. The beacon mount leg 16 may be configured to have an internal chase for retaining electrical wiring required to power the beacon 15. Alternatively, such wiring may simply be affixed to the exterior of the mount leg 16. That electrical wiring preferably terminates near the receptacle 12 for detachable insertion into electrical cords coupled to the vehicle's power plant or battery in a manner commonly known in the area of rear towing systems.

With continuing reference to FIG. 1, the system 10 includes a mount base 18 having a vehicle coupling member 19, a beacon mount member 20, and a structural bar 21. The vehicle-coupling member 19 is configured to be a male element to be removably inserted into and secured to the towing receptacle 12. The coupling member 19 may be fabricated of any suitable material and adaptable to be accepted by an array of receptacle types. The beacon mount member 20 is permanently or detachably affixed to the vehicle coupling member 19 as shown and includes a beacon mount attachment section 22. The attachment section 22 is open at its interior and is arranged to receive the mounting leg 16 therein. The attachment section 22 includes opposing pivot ports 23 designed to be aligned with corresponding pivot ports (not shown) of the mounting leg 16. The pivot ports 23 of the attachment section 22 and the pivot ports of the mounting leg 16 are designed to receive either one pivot pin that extends completely therethrough, or alternatively, a pair of pivot pins, one for each set of communicating pivot ports. The pivot pin is designed to secure the mounting leg 16 to the mount base 18 in a manner that allows for selectable movement of the mounting leg 16 outwardly away from the tailgate 13. Through that arrangement, the bed of the vehicle 11 may be accessed without removing the entire system 10 from the receptacle 12. Specifically, the mounting leg 16 may be pivoted away from the tailgate 13 so that the tailgate 13 can be opened while the mount base 18 remains in place.

Figure 2:
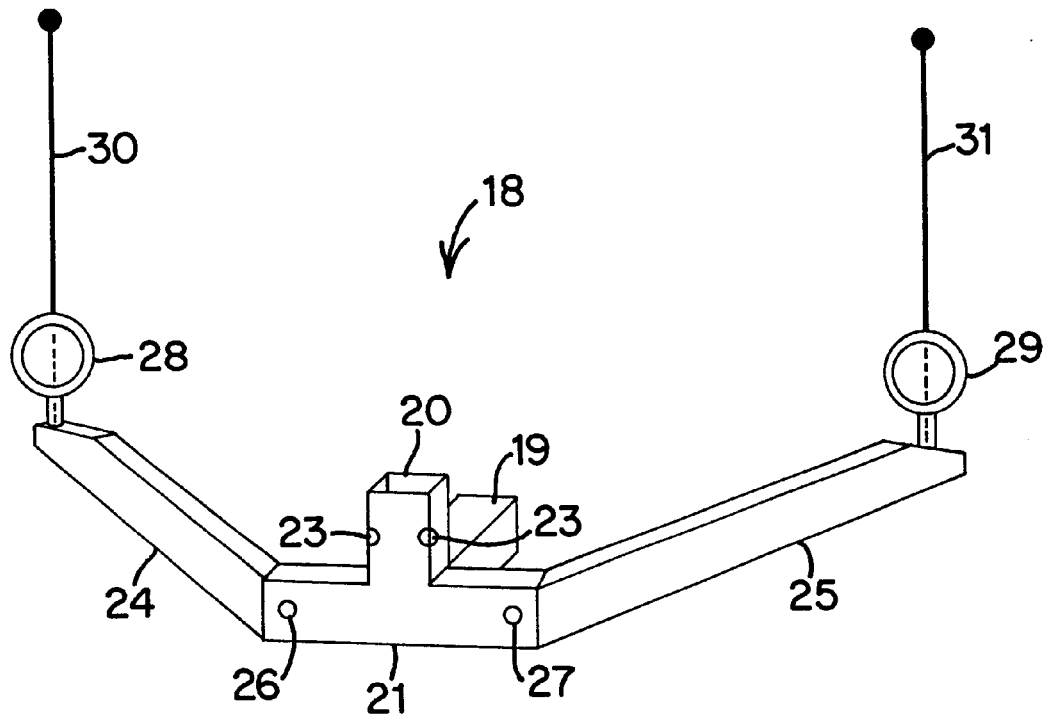
FIG. 2 is a front view of the first embodiment of the mount portion of the warning-light system of the present invention.

With reference to FIGS. 1 and 2, a first embodiment of the system 10 shown in those figures includes components that enable the user to apply vehicle location markers and rear-facing lighting to the mount base 18. In particular, a first base extension 24 and a second base extension 25 form part of the mount base 18. A first pivot port 26 at one end of the extension 24 having a corresponding removable pivot pin acts to couple the first extension 24 to the mount base 18 in a pivotally removable way. Similarly, a second pivot port 27 at one end of the extension 25 with corresponding removable pivot pin acts to couple the second extension 25 to the mount base 18 in a pivotally removable way. Although the extensions 24 and 25 may alternatively be fixed to the mount base 18, joining them in a pivotal manner reduces the overall size of the system 10 when it is to be stowed rather than deployed on the vehicle 11. The pivot pins may be retained in place by conventional means including, but not limited to, cotter pins. The extensions 24 and 25, as well as the other structural members of the system may be formed of metal or sufficiently strong non-metallic materials. Further, part or all of the components may be fabricated as solid pieces or as hollow pieces, dependent upon the required strength of the components, the desired weight of the system 10, and the need to provide chases for insertion of electrical wiring.

A second end of the first extension 24 optionally includes attached thereto a first rear-facing headlight 28. A second end of the second extension 25 optionally includes attached thereto a second rear-facing headlight 29. Electrical wiring suitable for powering the first headlight 28 and the second headlight 29 may run either internally in the respective extensions or be coupled externally to those extensions. As with the wiring for the beacon 15, the power supply may be obtained from standard tow supply sockets connected to the vehicle's electrical system. The vehicle driver may employ the headlights 28 and 29 to improve the field of vision at the rear of the vehicle 11.

Another supplemental component of the system 10 shown in FIGS. 1 and 2 includes a set of corner markers 30 and 31. A first marker 30 is detachably affixed to the second end of the first extension 24 and a second marker 31 is detachably affixed to the second end of the second extension 25. The markers 30 and 31 may be formed of any suitable material but are preferably flexible to a limited extent. They must be of sufficient height from the ends of the extensions 24 and 25 to allow the user to view them easily. They may be fabricated of an easy-to-see color, such as fluorescent orange.

Figure 3:
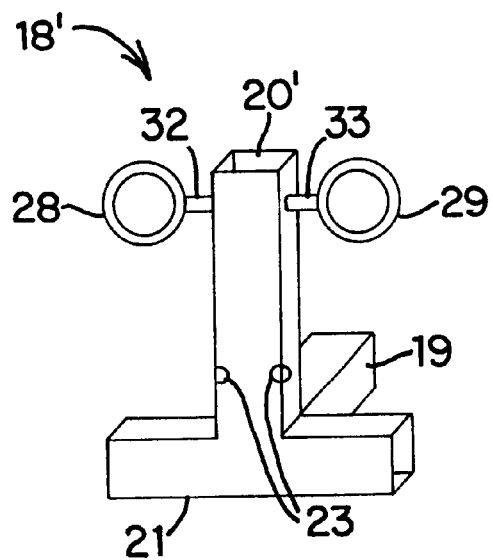
FIG. 3 is a front view of the second embodiment of the mount portion of the warning-light system of the present invention.

A second embodiment of the rear-mounted warning-light system 10 of the present invention is shown in FIG. 3. That structure includes an alternative mount base 18' having substantially the same vehicle coupling member 19 and structural bar 21 as used for the mount base 18 of FIG. 2, although the structural bar 21 does not include the pivot ports 26 and 27 and related pivot pin means. However, the beacon mount member 20' is different in that it includes an alternative means for deploying the headlights 28 and 29. Specifically, the mount member 20' includes a first headlight mount 32 and a second headlight mount 33 detachably connected directly thereto. Again, these headlights 28 and 29 may be coupled directly to the vehicle's electrical system using the conventional tow plug system. This arrangement enables the driver to enhance lighting at the rear of the vehicle 11, but does so with fewer parts than those employed in the first embodiment of the system 10. Of course, the overall field of vision may be less with the second embodiment of the mount base 18' than its first embodiment 18.

While the invention has been described with reference to particular example embodiments, it is intended to cover all modifications and equivalents as described in the following claims.

What is claimed is:

1. A rear-mounted warning-light system for deployment on the rear of a vehicle, the system comprising:
   a. a coupling member adapted to be removably coupled to the rear of the vehicle;
   b. a beacon mount member attached to said coupling member;
   c. a beacon mount leg pivotally coupled to said beacon mount member such that said beacon mount leg may be pivoted to a first position in which it extends upwards from said beacon mount member, and a second position in which it extends away from the rear of the vehicle while said coupling member remains coupled to the vehicle, said beacon mount leg having a lower portion pivotally coupled to said beacon mount member and an upper portion;
   d. a warning beacon connected to said upper portion of said beacon mount leg; and
   e. a first mount extension and a second mount extension connected to said beacon mount member and designed to extend from a central area of the rear of the vehicle outwardly toward the respective sides of the vehicle, wherein said first mount extension includes a first rear-facing light affixed to an end thereof adjacent to a first side of the vehicle and wherein said second mount extension includes a second rear-facing light affixed to an end thereof adjacent to a second side of the vehicle.

2. The system as claimed in claim 1 further comprising a beacon guard affixed to said upper portion of said beacon mount leg.

3. The system as claimed in claim 1 further comprising a first corner marker coupled to said end of said first mount extension and a second corner marker coupled to said end of said second mount extension.

4. The system as claimed in claim 1 wherein said first mount extension and said second mount extension are permanently affixed to said coupling means.

5. The system as claimed in claim 1 wherein said first mount extension and said second mount extension are pivotally affixed to said coupling means.

6. The system as claimed in claim 1 further comprising a first rear-facing light and a second rear-facing light coupled to said beacon mount member.

7. The system as claimed in claim 1 wherein said beacon mount member is a hollow tube and includes one or more pivot ports for receiving one or more pivot pins.

8. The system as claimed in claim 1 wherein said coupling member is a structural bar adapted for insertion into a conventional rear-towing receptacle.

9. A warning-light system for deployment in a roadway, the system comprising:
   a. coupling means for removably coupling the system to the rear of a vehicle;
   b. a beacon mount pivotally coupled to said coupling means such that said beacon mount may be pivoted away from the rear of the vehicle while said coupling means remains coupled to the vehicle, said beacon mount having a lower portion pivotally coupled to said coupling means and an upper portion, and wherein said beacon mount includes a base designed to permit stable placement of the system on a roadway; and
   c. a warning beacon connected to said upper portion of said beacon mount; and
   d. a first rear-facing light and a second rear-facing light coupled to said beacon mount.

* * * * *